United States Patent
Murata et al.

(10) Patent No.: US 8,049,922 B2
(45) Date of Patent: Nov. 1, 2011

(54) IMAGE FORMING APPARATUS AND PRINTING METHOD FOR CREATING A COMBINED IMAGE

(75) Inventors: Kazumi Murata, Kanagawa-ken (JP); Makoto Harigae, Tokyo (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 1109 days.

(21) Appl. No.: 11/291,424

(22) Filed: Nov. 30, 2005

(65) Prior Publication Data

US 2007/0121163 A1    May 31, 2007

(51) Int. Cl.
*G06K 15/02* (2006.01)
(52) U.S. Cl. ........................................ 358/1.2
(58) Field of Classification Search ............... 358/1.2, 358/1.18
See application file for complete search history.

(56) References Cited

U.S. PATENT DOCUMENTS

| | | | | |
|---|---|---|---|---|
| 5,131,058 A | * | 7/1992 | Ting et al. | 382/162 |
| 5,625,466 A | * | 4/1997 | Nakajima | 358/449 |
| 6,046,820 A | * | 4/2000 | Konishi | 358/1.9 |
| 6,999,207 B2 | * | 2/2006 | Nakane | 358/474 |
| 2002/0048032 A1 | * | 4/2002 | Ichikawa et al. | 358/1.11 |
| 2003/0160991 A1 | * | 8/2003 | Kadota | 358/1.13 |
| 2005/0071781 A1 | * | 3/2005 | Atkins | 715/838 |

FOREIGN PATENT DOCUMENTS

JP    2001-197286    1/2000

* cited by examiner

*Primary Examiner* — Benny Tieu
*Assistant Examiner* — Jeremiah Bryar
(74) *Attorney, Agent, or Firm* — Patterson & Sheridan, LLP

(57) ABSTRACT

An image forming apparatus includes: an image data processing unit that extracts one image area for each page from bitmap images for a continuous even number of pages of an identical sheet size and creates a combined image obtained by combining these image areas; and a print processing unit that prints the combined image on one print sheet or a size same as the sheet size.

20 Claims, 10 Drawing Sheets

| PROCESSING / JUDGMENT | DOCUMENT | | | |
|---|---|---|---|---|
| | 1ST PAGE A4 SIZE | 2ND PAGE A4 SIZE | 3RD PAGE A4 SIZE | 4TH PAGE A4 SIZE |
| ST1 | Pn=1 | | | |
| ST2 | No (Pn=1) | No ※1 (Pn=2) | No ※2 (Pn=3) | Yes ※3 (Pn=4) ※4 |
| ST3 | | Pn=2 | Pn=3 | Pn=4 |
| ST4 | | Yes | Yes | Yes |
| ST5 | | Pe=2 | Pe=3 | Pe=4 |
| ST6 | | ※1 | ※2 | ※3 |
| ST7 | | | | |
| ST8 | | | | |
| ST9 | | | | No ※4 Ps=1,Pe=4 |
| ST10 | | | | Yes |
| ST11 | | | | IMAGE AREA COMBINATION FOR 1ST TO 4TH PAGES |

FIG. 5

| PROCESSING / JUDGMENT | DOCUMENT | | | | | |
|---|---|---|---|---|---|---|
| | 1ST PAGE A4 SIZE | 2ND PAGE A4 SIZE | 3RD PAGE A4 SIZE | 4TH PAGE A4 SIZE | 5TH PAGE A5 SIZE | 6TH PAGE A5 SIZE |
| ST1 | Pn=1 ⇩ | | | | | |
| ST2 | No (Pn=1) | ※1 No (Pn=2) | ※2 No (Pn=3) | ※3 No (Pn=4) | ※4 No (Pn=5) | ※5 Yes (Pn=6) |
| ST3 | | Pn=2 ⇩ | Pn=3 ⇩ | Pn=4 ⇩ | Pn=5 ⇩ | Pn=6 ⇩ ※6 |
| ST4 | | Yes ⇩ | Yes ⇩ | Yes ⇩ | No ▪▪▪ | Yes ⇩ |
| ST5 | | Pe=2 ⇩ | Pe=3 ⇩ | Pe=4 ⇩ | | Pe=6 ⇩ |
| ST6 | | ※1 | ※2 | ※3 | Yes ⇩ | ※5 |
| ST7 | | | | | COMBINATION PROCESSING FOR 1ST TO 4TH PAGES ⇩ | |
| ST8 | | | | | Ps=5, Pe=5, Sz=A5 SIZE ⇩ | |
| ST9 | | | | | ※4 | ※6 No Ps=5, Pe=6 ⇩ |
| ST10 | | | | | | Yes ⇩ |
| ST11 | | | | | | COMBINATION PROCESSING FOR 5TH AND 6TH PAGES |

FIG. 8

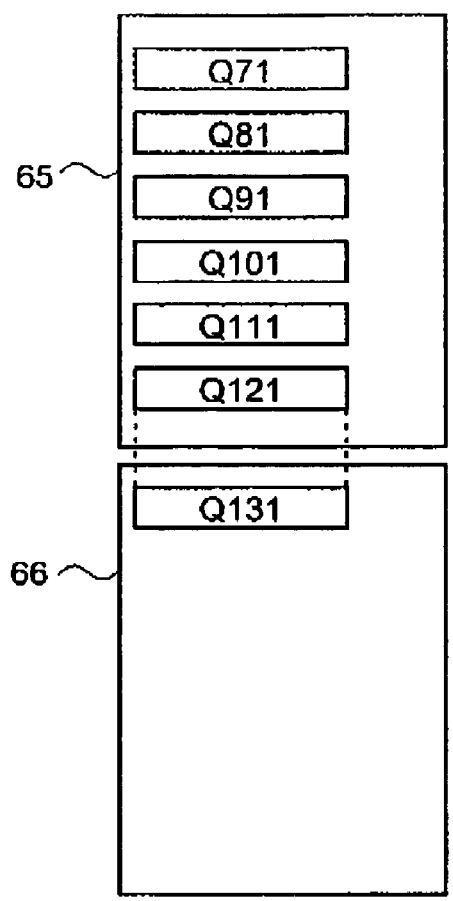 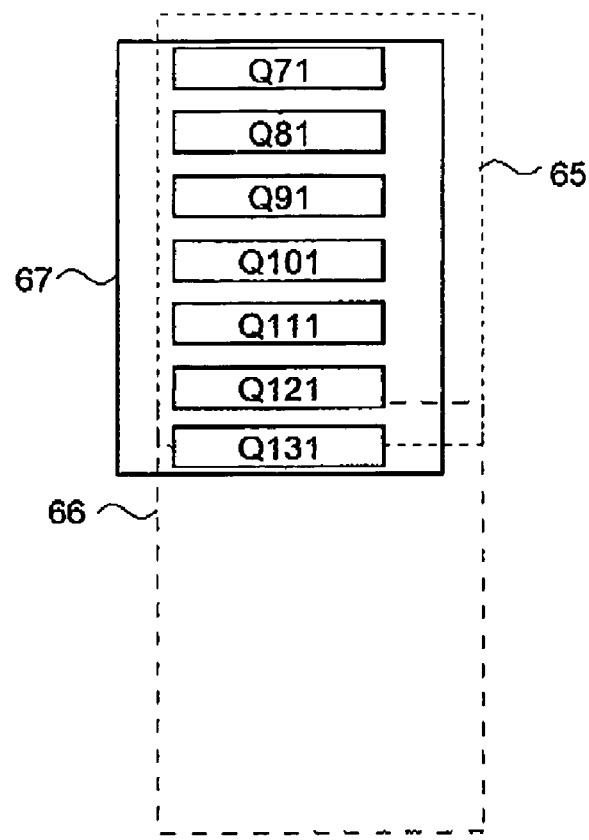
FIG. 10A
FIG. 10B

IMAGE FORMING APPARATUS AND PRINTING METHOD FOR CREATING A COMBINED IMAGE

BACKGROUND OF THE INVENTION

1. Field of the Invention

The present invention relates to image forming apparatuses such as a digital copying machine and a printer and an image printing method of printing a bitmap image created by combining bitmap images for plural pages.

2. Description of the Related Art

As an image forming apparatus functioning as a digital copying machine and a printer, there is known an image forming apparatus having a function of printing a document with plural sheets on one print sheet (so-called N-in-1 printing function). For example, JP-A-2001-197286 discloses a method of forming a combined image of a document with sheets of different sizes or directions and printing the combined image on one print sheet.

In an N-in-1 printing method disclosed in JP-A-2001-197286, sizes of images actually drawn on sheets of the document, that is, image areas, are not taken into account. For example, in the case where a document comprised of A3 size sheets is subjected to N-in-1 print processing, it may be necessary to reduce A3 size to A4 size. In this case, even if a size of an image actually drawn on the sheet of A3 size is slightly larger than A4 size and other areas of the sheet are margins, A3 size including the image area and the margin area is reduced to A4 size. Therefore, an indistinct document including the small image area and the large margins is created.

When a user prints an image displayed on a display of a personal computer (PC), the user often performs print processing without knowing a size of the image or prints the image without checking a preview. In this case, although the user desires to print the image on one print sheet, the image may be divided according to a size of a sheet set in a printer and printed on plural sheets in a divided state. Even if the N-in-1 printing is performed, since gaps are formed among the divided images, it is impossible to obtain a print result desired by the user. When the print result desired by the user is not obtained in this way, sheets, toner, and the like are wasted. Further, since it is necessary to adjust the image size on software of the PC or a printer browser and repeat the printing, a work load imposed on the user increases.

SUMMARY OF THE INVENTION

The invention has been devised in view of such circumstances and it is an object of the invention to provide an image forming apparatus and an image printing method that can create a document, in which images are arranged as desired by a user, from bitmap images for plural pages.

According to a first aspect of the invention, an image forming apparatus is provided that includes an image data processing unit that extracts one image area for each page from bitmap images for a continuous even number of pages of an identical sheet size and creates a combined image obtained by combining these image areas, and a print processing unit that prints the combined image on one print sheet of a size same as the sheet size.

According to a second aspect of the invention, an image printing method is provided that includes extracting one image area for each page from bitmap images for a continuous even number of pages of an identical sheet size, creating a combined image obtained by combining the even number of image areas extracted, and printing the combined image on one print sheet of a size same as the sheet size. According to the invention, a user can create a document, on which images are arranged as desired by the user, from bitmap images for plural pages obtained from a scanner, a computer, or the like even if the user does not perform detailed print setting. The user can also create a document with a clear image because only image portions are combined to be printed on one sheet. Moreover, it is possible to prevent misprinting, in which predetermined images are printed on plural sheets despite the fact that the user desires to print the images on one sheet, from occurring. In this way, it is possible to control wasteful consumption of sheets, toner, and the like.

DESCRIPTION OF THE DRAWINGS

In the accompanying drawings;

FIG. 5 is a diagram showing a result of the data processing of the flowchart shown in FIG. 4;

FIG. 8 is a diagram showing a result of the data processing of the flowchart shown in FIG. 4, which is applied to the process shown in FIG. 7;

FIG. 10A is a diagram showing images drawn on sheets of another document; and FIG. 10B is a diagram showing a combined image formed from the document in FIG. 10A.

DETAILED DESCRIPTION OF THE INVENTION

Figure 1:
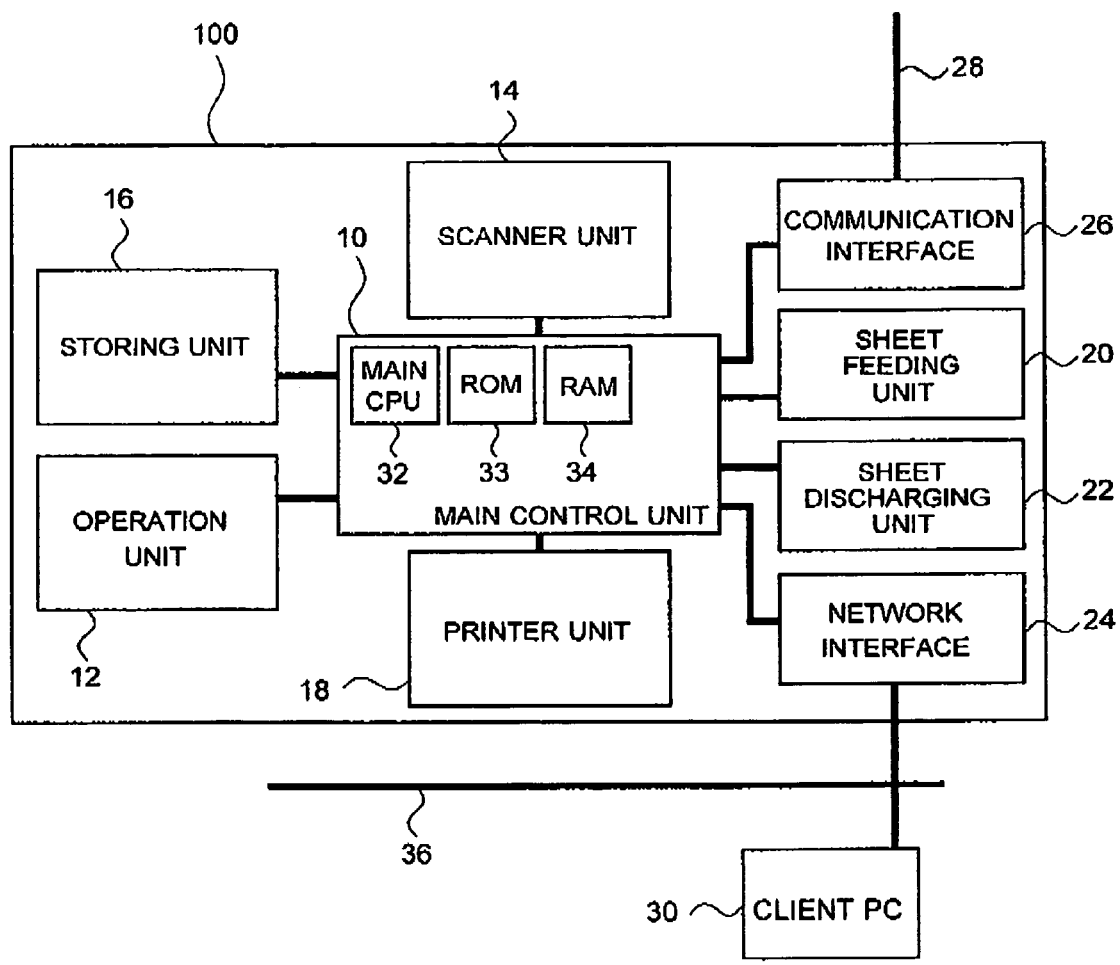
FIG. 1 is a block diagram showing a system configuration of an image forming apparatus according to an embodiment of the invention.

An embodiment of the invention will be hereinafter explained in detail with reference to the accompanying drawings. FIG. 1 is a block diagram of a system configuration of an image forming apparatus according to an embodiment of the invention. An image forming apparatus 100 is, for example, a digital Multi-Function Peripheral (MFP) having functions of a copying machine, a printer, and a facsimile.

The image forming apparatus 100 includes a main control unit 10 that bears roles of a mechanical control unit for controlling mechanical operations of the entire apparatus and an image data processing unit for processing various data concerning images, an operation unit 12 with which a user sets a print job and the like, a scanner unit 14 for reading an image of a document, a storing unit 16 for storing page data subjected to bitmap image conversion, a printer unit 18 for printing page data (a bitmap image), a sheet feeding unit 20 for feeding a print sheet designated in the operation unit 12 to the printer unit 18, a sheet discharging unit 22 for discharging a sheet subjected to print processing in the printer unit 18, a network interface 24 for connecting a client PC 30, and a communication interface 26.

The main control unit 10 includes a main Central Processing Unit (CPU) 32, a Read Only Memory (ROM) 33, a Random Access Memory (RAM) 34, a page memory control unit, and a page memory. The main CPU 32 manages control of image data processing and the entire apparatus. Various programs (various kinds of software) required for performing operation control for the image forming apparatus 100 and processing for image data in accordance with the print job set in the operation unit 12 are stored in the ROM 33. The RAM 34 temporarily stores image data and the like.

The operation unit 12 includes operation keys for setting print job conditions and instructing start, stop, and the like of a print job and a display for displaying set conditions and a progress state of the print job. In the setting of the print job, for example, the number of prints, a print size, simplex printing, duplex printing, image combination printing, N-in-1 printing, sort, and the like are designated.

The 'image combination printing' refers to processing for extracting one image area from respective pages of a document having a continuous even number of pages of an identical sheet size by taking into account the sizes of images actually drawn on each page, creating a combined image obtained by combining these image areas, and printing the combined image on one-sheet. The document includes not only images printed on a sheet but also print data created by the client PC 30. On the other hand, the 'N-in-1 printing' refers to processing for printing a document of plural pages on one sheet of a designated size. Therefore, in the N-in-1 printing, sizes of images actually drawn on the respective pages of the document are not considered and only page sizes are considered. Thus, the 'image combination printing' and the 'N-in-1 printing', which can be performed in the image forming apparatus 100, are different kinds of processing.

The scanner unit 14 includes an exposure lamp for exposing a document stand, an Automatic Document Feeder (ADF) for sequentially feeding a document, a Charge Coupled Device (CCD) for reading reflected light at the time of exposure processing, and a motor for driving the CCD to scan the document. The storing unit 16 is, for example, a Hard Disk Drive (HDD) or a RAM. The printer unit 18 includes hardware for performing a series of processing for charging a photosensitive drum and, then, performing laser exposure, toner development, transfer, and fixing.

The client PC 30 that provides the image forming apparatus 100 with print data through a network 36 is connected to a network interface 24. The network 36 is, for example, a Local Area Network (LAN) and is connected to the Internet. In the client PC 30, print data such as a sentence and a figure is created using application software. In the client PC 30, it is possible to browse a web page and the like, which are laid open to the public in a web site, through the network 36. A driver for using the image forming apparatus 100 as a printer is installed in the client PC 30. The client PC 30 requests the image forming apparatus 100 to perform printing of print data. The communication interface 26 is used for transmitting and receiving facsimile data through a telephone line 28.

A method of performing the image combination printing by using the image forming apparatus 100 will be explained. The image forming apparatus 100 is herein used as a printer for the client PC 30.

Figure 2A:
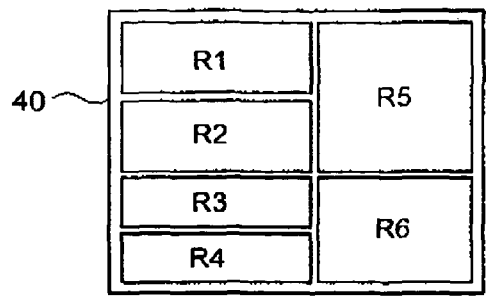
FIG. 2A is a diagram showing images, which a user is about to print, displayed on a display of a client PC.
Figure 2B:
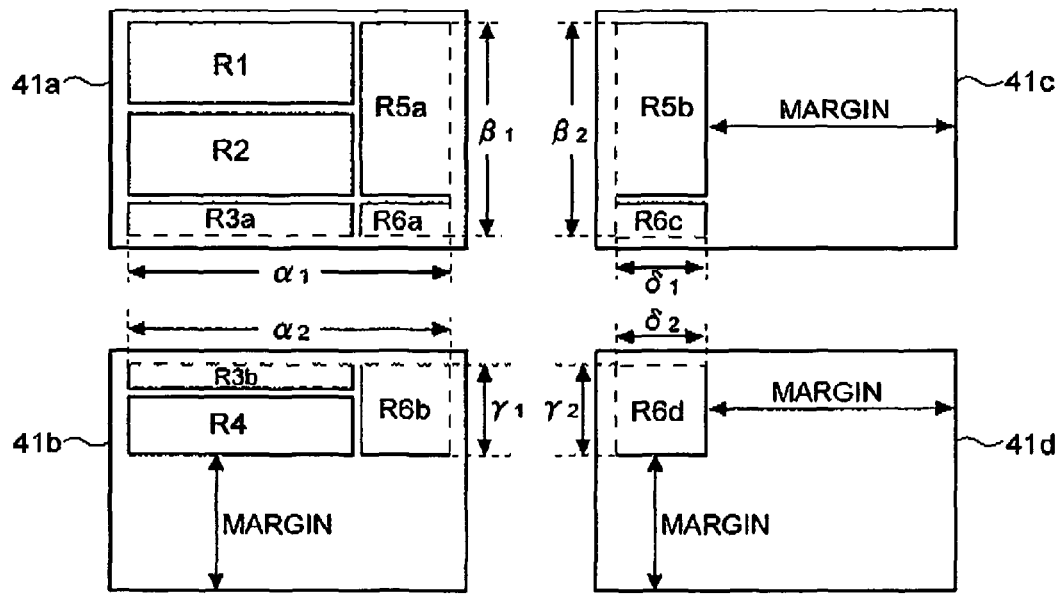
FIG. 2B is a diagram of bitmap image conversion of print data transmitted from the client PC to the image forming apparatus.
Figure 2C:
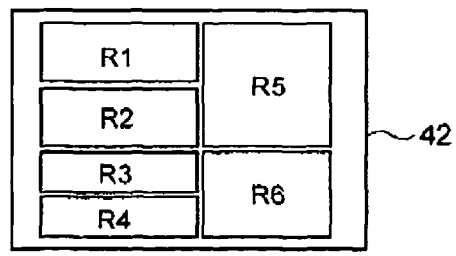
FIG. 2C is a diagram showing a print result obtained by performing image combination printing from the bitmap images shown in FIG. 2B and printing a combined image.
Figure 3:
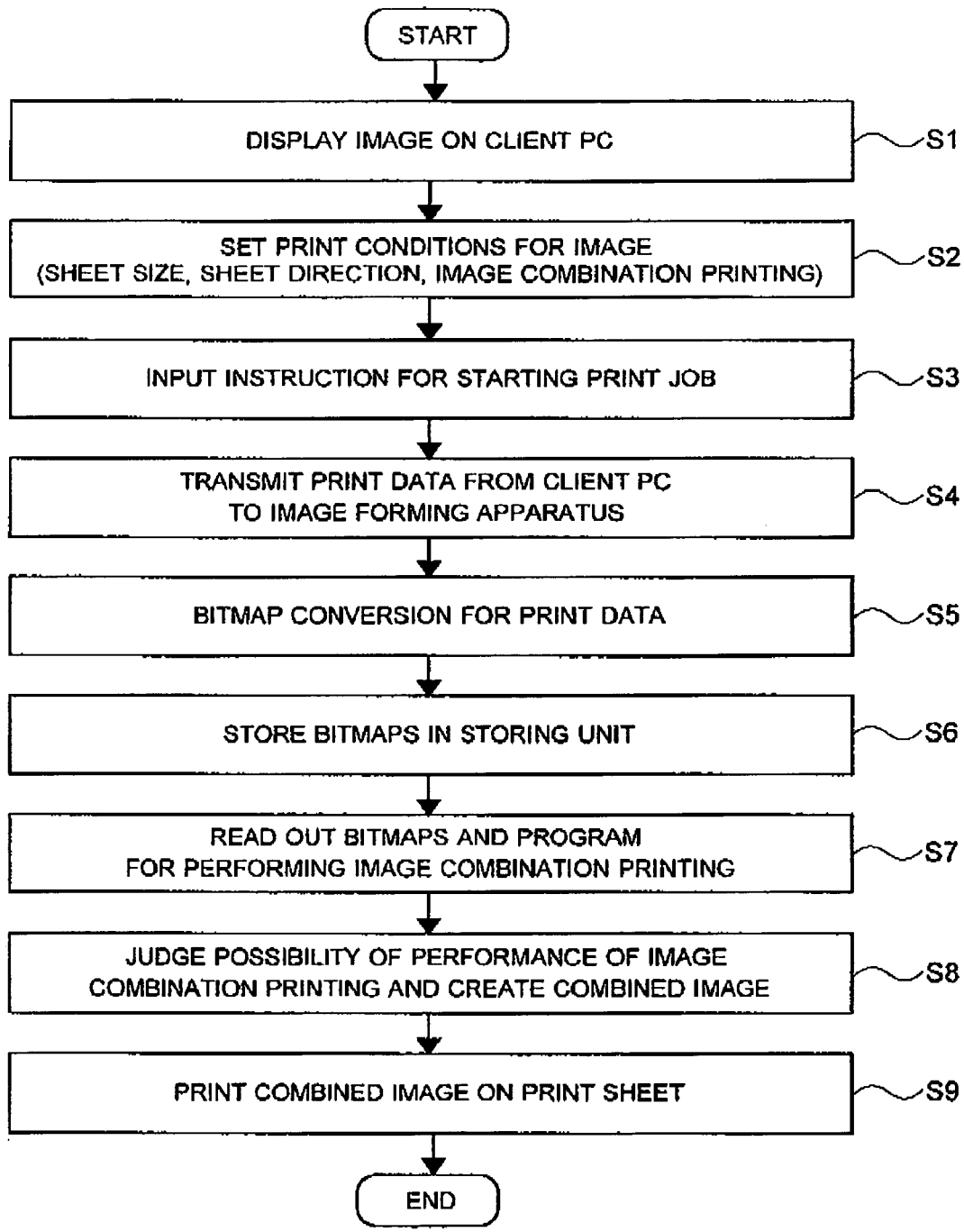
FIG. 3 is a flowchart showing a process of the entire image combination printing.

FIG. 2A is a diagram of images, which a user is about to print, displayed on a display 40 of the client PC 30. FIG. 2B is a diagram of bitmap image conversion of print data transmitted from the client PC 30 to the image forming apparatus 100. FIG. 2C is a diagram of a print result of the image combination printing performed by the image forming apparatus 100. FIG. 3 is a flowchart of a print job for printing the images in FIG. 2A.

As shown in FIG. 2A, for example, images R1 to R6 of a web page laid open to the public in a web site are displayed on the display 40 of the client PC 30 (S1). In order to print the images R1 to R6 on one sheet in an arrangement shown in FIG. 2A, the client starts a printer browser in the client PC 30 and sets print conditions (S2). In S2, the user designates a size of a print sheet, a direction of the print sheet, and performance of the image combination printing (i.e., performance of printing to fit the images R1 to R6 into one print sheet). An A4 size is herein designated as the sheet size and a sideways direction is designated as the sheet direction.

The user inputs an instruction for starting a print job to the client PC 30 (S3). Then, print data is created in a page description language and is sent from the client PC 30 to the printer unit 18 of the image forming apparatus 100 through the network 36 (S4).

The print data is automatically created by a printer driver on the basis of the designated sheet size, image sizes of the images R1 to R6, a printing resolution of the printer, and the like. Therefore, even if an image looks as if the image fits in A4 size on a screen of the display 40, actually, the image may be divided on plural pages. Print data for four pages of A4 size is herein created when the images are converted into bitmap images in the image forming apparatus 100, in which the image R3 is divided into images R3a and R3b, the image R5 is divided into images R5a and R5b, and the image R6 is divided into images R6a, R6b, R6c and R6d, as shown in FIG. 2B.

The print data is converted into bitmap images for each page by a Raster Image Processor (RIP) in the printer unit 18 (S5). In this way, bitmap images (page data) 41a to 41d for four pages are created. The bitmap images 41a to 41d are compressed and stored in the storing unit 16 (S6).

After the S6 processing, in the main control unit 10 of the image forming apparatus 100, a program for performing the image combination printing is read out from the ROM 33 of the main control unit 10. The bitmap images stored in the storing unit 16 are read out to the main control unit 10 (S7).

Subsequently, in the main control unit 10, it is judged whether it is possible to perform the image combination printing on the bitmap images 41a to 41d for four pages (S8). The main CPU 32 performs this work on the RAM 34. A flowchart shown in FIG. 4 describes the processing in S8 in detail. FIG. 5 is a diagram showing a result of the data processing shown in the flowchart in FIG. 4.

First, as initial conditions, a combination start page Ps, a combination end page Pe, a presently processed page Pn, a total number of pages (the number of sheets of a document) Pm, and a sheet size Sz are set (ST1). Ps, Pe, and Pn are automatically set to 1 and Pm is automatically set to 4 on the basis of the bitmap images 41a to 41d read out in S7 processing. The sheet size Sz is set to the sheet size designated in S2 processing. The sheet size Sz may be set to a size of the bitmap image 41a on the first page.

In the subsequent processing in ST2 to ST5 sizes of the bitmap images 41a to 41d are collated. The size collation is performed for a page size including an image and margins, that is, a sheet size. In ST2, it is judged whether a condition 'Pn≧Pm' is satisfied. Since the presently processed page Pn is 1 ('Pn=1'), it is judged in ST2 that the condition 'Pn≧Pm' is not satisfied ('No'). In ST3, according to processing of 'Pn=Pn+1', the presently processed page Pn is changed to 2 ('Pn=2'). In ST4, the sheet size designated as Sz and a sheet size of a second page are compared. In this case, all the sizes of the bitmap images 41a to 41d are A4. Therefore, it is judged in ST4 that the sheet size designated as Sz and the sheet size of the second page are the same ('Yes'). In ST5, according to processing of 'Pe=Pn', the combination end page Pe is changed to 2 ('Pe=2').

Subsequently, ST2 to ST5 are performed with the presently processed page Pn set to 2 ('Pn=2'). Then, it is judged in ST2 that the condition 'Pn≧Pm' is not satisfied ('No'). In ST3, the presently processed page Pn is changed to 3 ('Pn=3'). It is judged in ST4 that the sheet size designated as Sz and the sheet size of the third page are the same ('Yes'). In ST5, the combination end page Pe is changed to 3 ('Pe=3'). The judgment and the processing in ST2 to ST5 are performed with the presently processed page Pn set to 3 ('Pn=3'). Then, it is judged in ST2 that the condition 'Pn≧Pm' is not satisfied ('No'). In ST3, the presently processed page Pn is changed to 4 ('Pn=4'). It is judged in ST4 that the sheet size designated as Sz and the sheet size of the fourth page are the same ('Yes'). In ST5, the combination end page Pe is changed to 4 ('Pe=4').

Moreover, the judgment in ST2 is performed with the presently processed page Pn set to 4 ('Pn=4'). Then, since the presently processed page Pn is equal to the total number of pages Pm, it is judged that the condition 'Pn≧Pm' is satisfied ('Yes'). The main CPU 32 proceeds to ST9. Note that processing in ST6 to ST8 is performed when bitmap images of different sizes are included. In the case of this example, the processing is not performed. The processing in ST6 to ST8 will be explained later when the image forming apparatus 100 used as a copying machine will be explained.

It is judged in ST9 whether the condition 'Ps=Pe' is satisfied. Since the combination start page Ps is 1 ('Ps=1') and the combination end page Pe is 4 ('Pe=4'), it is judged in ST9 that the condition 'Ps=Pe' is not satisfied ('No'). In this way, it is judged in ST10 whether combination of image areas of the bitmap images for four pages is possible. Judgment criteria in ST9 will be explained with reference to FIG. 2B.

As a premise for combination of image areas, the following two conditions have to be satisfied. First, there are bitmap images for an even number of pages. Second, sizes of continuous bitmap images are the same. In the case of this example, these conditions are satisfied.

The bitmap images 41a to 41d are arranged in sizes with an aspect ratio thereof fixed. As shown in FIG. 2B, the bitmap images 41a to 41d are automatically arranged in A3 size on the first and the second pages, A3 size in the third and the fourth pages, and A2 size in the entire image. Image areas are extracted from the respective bitmap images 41a to 41d. Only one image area is recognized in the bitmap image for one page. For example, three images R3b, R4, and R6b are drawn in the bitmap image 41b. However, these images are not recognized as separate images. An area of a rectangular shape (although the area is rectangular in this case, the area may be square depending on an image) with a minimum area including the three images R3b, R4, and R6b is extracted as an image area. In this case, margins above and on the left of the images R3b, R4, and R6b are not considered.

In order to make it possible to combine an image area on a first page and an image area on a second page, widths ($\alpha_1$ and $\alpha_2$ of these image areas are required to be the same. In order to make it possible to combine the image area on the first page and an image area on a third page, heights $\beta_1$ and $\beta_2$ of these image areas are required to be the same. In order to make it possible to combine the image areas on the first to the third pages and an image area on a fourth page, height $\gamma_1$ of the image area on the second page and height $\gamma_2$ of the image area on the fourth page are required to be the same and width $\delta_1$ of the image area on the third page and width $\delta_2$ of the image area on the fourth page are required to be the same. Values of $\alpha_1, \alpha_2, \beta_1, \beta_2, \gamma_1, \gamma_2, \delta_1$, and $\delta_2$ are automatically calculated on the basis of the image areas extracted.

The image combination processing is possible when it is possible to form a new image having a square or rectangular image area by combining the image areas extracted from the respective bitmap images.

In the case shown in FIG. 2B, such conditions of the image combination printing are satisfied. This is also evident from the fact that the respective images shown in FIG. 2B are obtained by dividing the images shown in FIG. 2A lengthwise and sideways. Therefore, it is judged in ST10 that combination of the image areas of the bitmap images for four pages is possible ('Yes').

In this way, a bitmap image of a combined image, in which the images shown in FIG. 2A are reproduced, is created (ST11). Unless the combined image is reduced in size, it may be impossible to fit the combined image into the sheet size designated in S2. In order to cope with such a situation, the main control unit 10 automatically determines a reduction ratio of the combined image and creates an image reduced in size of the combined image. Alternatively, it is also possible that a warning requesting reduction in size of the combined image is displayed on the operation unit 12 to allow the user to select an appropriate reduction ratio. This warning may be displayed on the display of the client PC 30 according to two-way communication between the image forming apparatus 100 and the client PC 30. In that case, the user sets a reduction ratio in the client PC 30.

A bitmap image of the combined image finally adjusted to fit in the designated sheet size is printed on a sheet 42 of A4 size as shown in FIG. 2C (S9).

When the image forming apparatus 100 is used as a printer, the designation of the image combination printing does not always have to be performed in the client PC 30 as described above. The designation may be performed in the operation unit 12 of the image forming apparatus 100. Before sending print data from the client PC 30 to the image forming apparatus 100, the user designates performance of the image combination printing in the image forming apparatus 100. It is preferable that, in the image forming apparatus 100, when one print job concerning the image combination printing is completed, the designation of the image combination printing is automatically canceled. This takes into account the fact that the image forming apparatus 100 is used by plural users.

When the image forming apparatus 100 is used as a printer, it is possible to prevent misprinting, in which images are separately printed on plural sheets, from occurring and easily obtain a desired print result by designating the image combination printing. This makes it possible to control wasteful consumption of sheets and toner. It is also possible to reduce a burden on the user caused by, for example, setting print conditions in detail on the printer browser of the client PC 30 and repeating the printing.

It is also possible to suitably use such image combination printing when the user edits a document, a table, a graph, an illustration, or the like in the client PC 30 using word processor software, spreadsheet software, graphic software, or the like and prints a result of the edition.

An embodiment will be explained, in which the image combination printing is performed using the image forming apparatus 100 as a copying machine. In this case, in order to perform the image combination printing in the image forming apparatus 100, the two following conditions are required to be satisfied again. First, the number of sheets of a document is an even number. Second, the sheets continue in the same size. Therefore, the document may be comprised of sheets of different sizes. However, if sheets of the same size are not continuous in some part of the document, the image combination printing is not performed as a result.

Figure 6A:
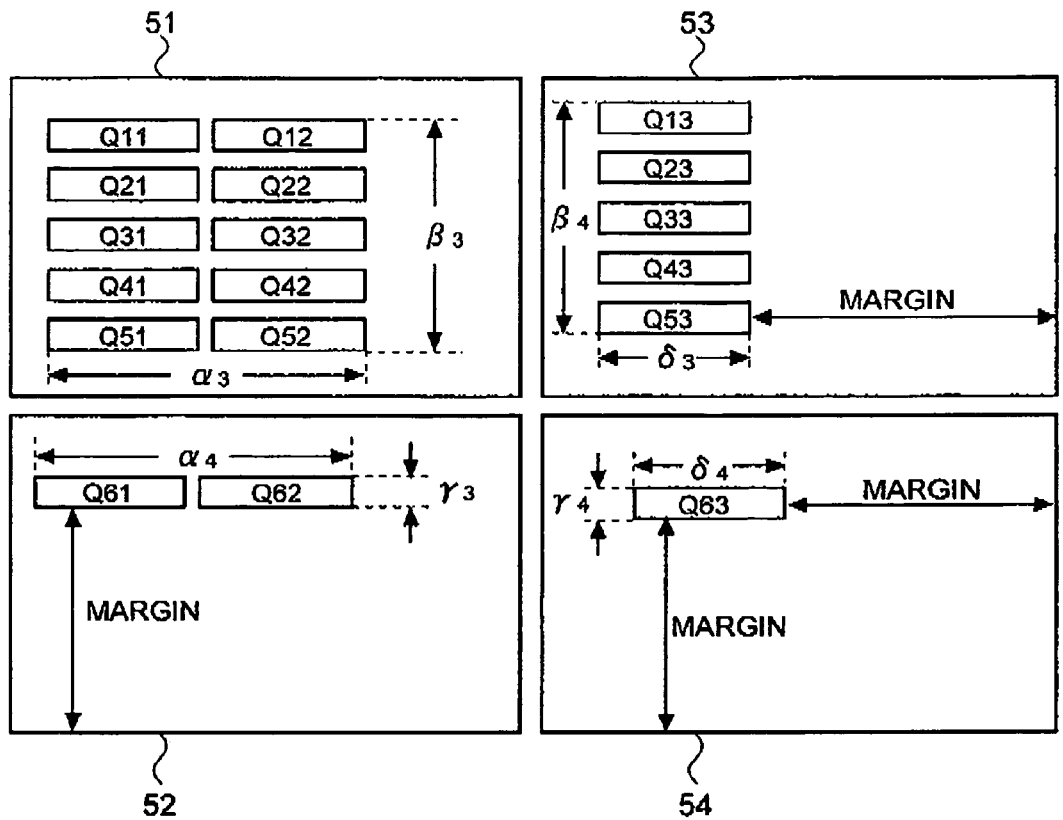
FIG. 6A is a diagram showing images on first to fourth pages of a document and a result of extraction of image areas.
Figure 6B:
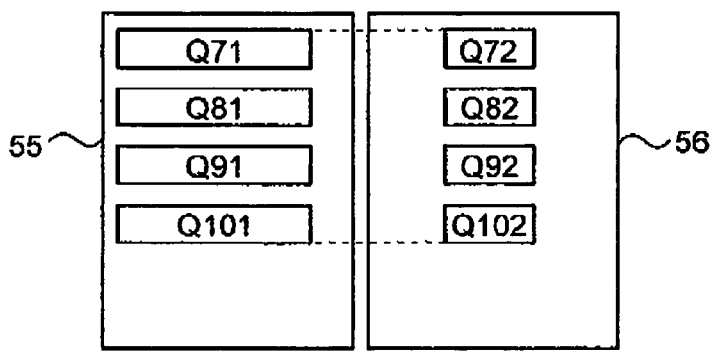
FIG. 6B is a diagram showing images on fifth and sixth pages of the document and a result of extraction of image areas.
Figure 7:
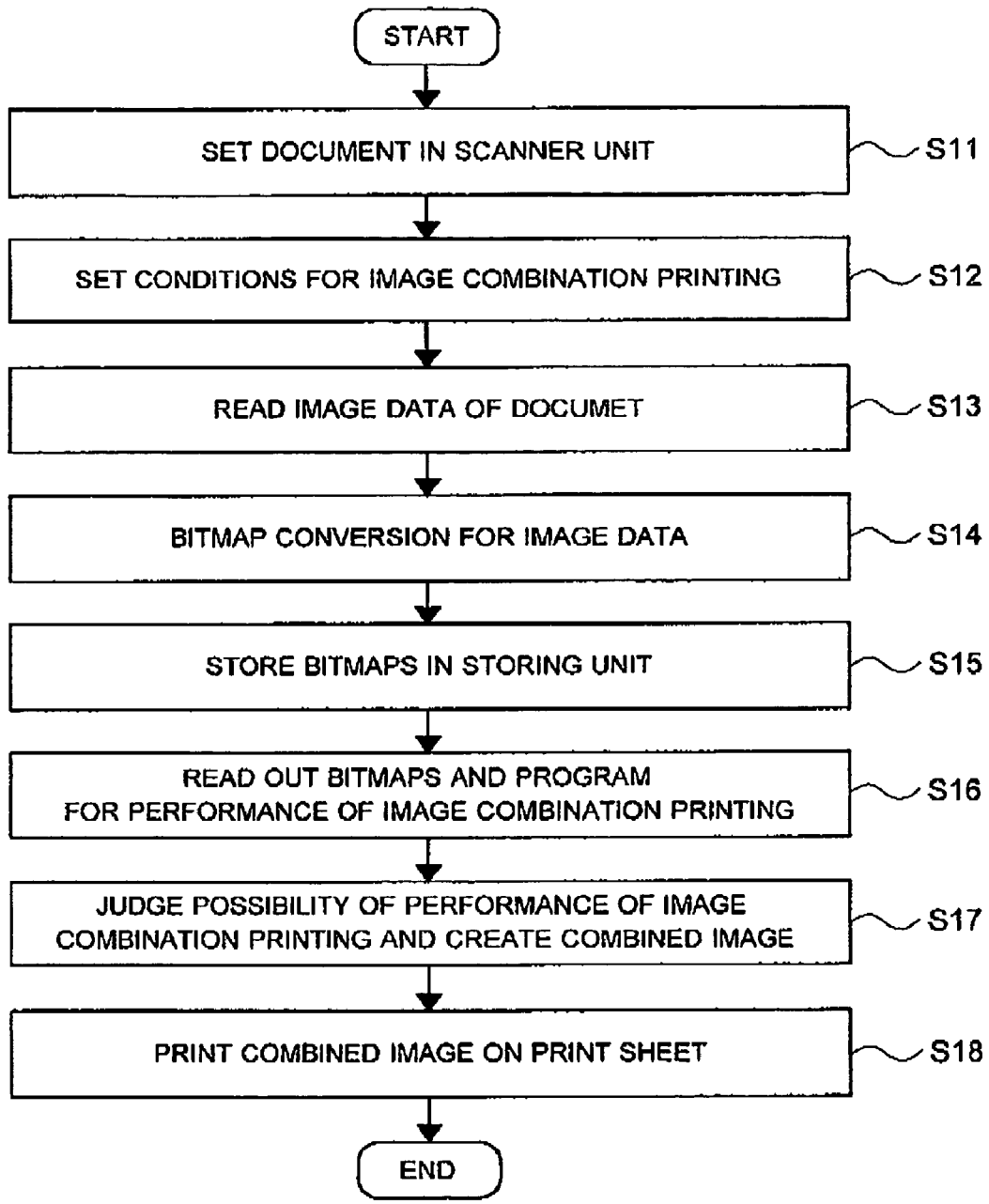
FIG. 7 is a flowchart of processing for combining the images shown in FIG. 6A using the image forming apparatus.

A document consists of four sheets of A4 size and two sheets of A5 size. First to fourth pages are A4 size and fifth and sixth pages are A5 size. FIG. 6A is a diagram showing images on the first to the fourth pages and a positional relation among the images. FIG. 6B is a diagram showing images on the fifth and the sixth images and a positional relation between the images. FIG. 7 is a flowchart of processing of the entire image combination printing.

Ten images (Qmn; m=1 to 5, n=1 and 2) are drawn on a sheet 51 of the first page. Two images (Qmn; m=6, n=1 and 2) are drawn on a sheet 52 of the second page. Five images (Qmn; m=1 to 5, n=3) are drawn on the third page. One image (Qmn; m=6, n=3) is drawn on the fourth page. Four images (Qmn; m=7 to 10, n=1) are drawn on the fifth page. Four images (Qmn; m=7 to 10, n=2) are drawn on the sixth page.

The user sets a document consisting of the four sheets 51, 52, 52, and 54 of A4 size shown in FIG. 6A and the two sheets 55 and 56 of A5 size shown in FIG. 2B in the scanner unit 14 (S11). In the operation unit 12, the user designates 'image combination printing' as a print job (S12). The order of S11 and S12 may be reversed.

After the S12 processing, reading of the document is started in the scanner unit 14 (S13). In this case, the main CPU 32 counts the number of sheets of the document. The document is read in order from the sheet 51. Image data read by the scanner unit 14 is sent to the main control unit 10 page by page and converted into a bitmap image for each page (page data) in the main control unit 10 (S14). The bitmap image is compressed to have a reduced data size and temporarily stored in the page memory. Thereafter, the bitmap image is read out from the page memory in an order same as the order of the sheets of the document and stored in the storing unit 16 (S15).

Subsequently, the program for performing the image combination printing is read out from the ROM 33 of the main control unit 10. The bitmap images stored in the storing unit 16 are read out to the main control unit 10 (S16). The main control unit 10 judges whether it is possible to perform the image combination printing on the bitmap images for the six pages (S17).

Figure 4:
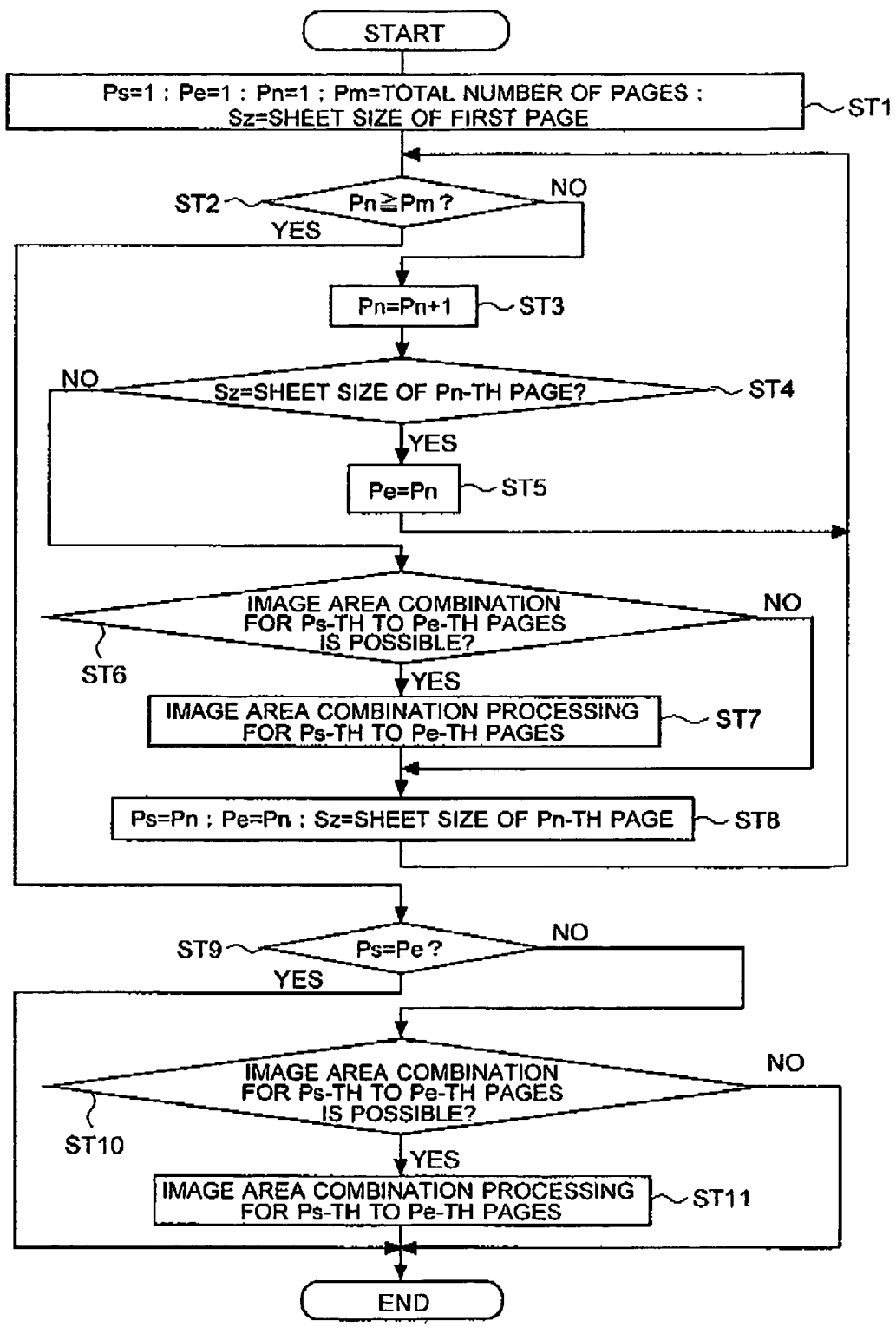
FIG. 4 is a flowchart of data processing for combining image areas.

A flowchart of data processing for performing image combination in this case is the same as that shown in FIG. 4. FIG. 8 is a diagram showing a result of the data processing of the flowchart shown in FIG. 4 in this example.

In ST1, the combination start page Ps, the combination end page Pe, and the presently processed page Pn are set to 1, respectively. The number of page data counted by the main CPU 32 is used for the setting of the total number of pages (the number of sheets of a document) Pm. Therefore, in the case of this example, the total number of pages PRn is set to 6 ('Pm=6'). The sheet size Sz is automatically set to a sheet size of the combination start page Ps, that is, A4 size of the sheet 51.

Details of the processing in ST2 to ST5 are as explained above. In ST2, since the presently processed page Pn is 1 ('Pn=1') at first, it is judged in ST2 that the condition 'Pn≧Pm' is not satisfied ('No'). In ST3, the presently processed page Pn is changed to 2 ('Pn=2'). It is judged in ST4 that the sheet size designated as Sz and the sheet size of the second page are the same ('Yes'). In ST5, the combination end page Pe is changed to 2 ('Pe=2'). Subsequently, ST2 to ST5 are performed with the presently processed page Pn set to 2 ('Pn=2'). Then, it is judged in ST2 that the condition 'Pn≧Pm' is not satisfied ('No'). In ST3, the presently processed page Pn is changed to 3 ('Pn=3'). It is judged in ST4 that the sheet size designated as Sz and the sheet size of the third page are the same ('Yes'). In ST5, the combination end page Pe is changed to 3 ('Pn=3'), The judgment and the processing in ST2 to ST5 are performed with the presently processed page Pn set to 3 ('Pn=3'). Then, it is judged in ST2 that the condition 'Pn≧Pm' is not satisfied ('No'). In ST3, the presently processed page Pn is changed to 4 ('Pn=4'). It is judged in ST4 that the sheet size designated as Sz and the sheet size of the fourth page are the same ('Yes'). In ST5, the combination end page Pe is changed to 4 ('Pe=4').

Moreover, the judgment and the processing in ST2 and the subsequent steps are performed with the presently processed page Pn set to 4 ('Pn=4'). It is judged in ST2 that the condition 'Pn≧Pm' is not satisfied ('No'). In ST3, the presently processed page Pn is changed to 5 ('Pn=5'). The sheet of the fifth page is A5 size, which is different from A4 size of the sheet 51 of the first page. Therefore, it is judged in ST4 that the sheet size designated as Sz and the sheet size of the fifth page are not the same ('No'). In this case, the main CPU 32 proceeds to ST6.

In ST6, it is judged whether it is possible to combine image areas of the pages from Ps to Pe (Ps=1, Pe=4). It is possible to consider that the bitmap images on the respective pages are the same as those on the sheets 51 to 54. In the case where the number of sheets is $2^k$ (k; natural number), the sheets are sequentially arranged in a size with an aspect ratio of the sheets fixed. Therefore, in the case of this example, the sheets are arranged in advance as shown in FIG. 6A. However, as described later, it is preferable that this sheet arrangement can be changed on the operation unit 12.

A method of extracting image areas from the respective pages and the conditions for judging possibility of combining the image areas extracted are the same as the method and conditions previously described to print an image on the display of the client PC 30. Therefore, an image area with width $\alpha_3$ and height $\beta_3$ is extracted from the first page, an image area with width $\alpha_4$ and height $\beta_3$ is extracted from the second page, an image area with width $\delta_3$ and height $\beta_4$ is extracted from the third page, and an image area with width $\delta_4$ and height $\gamma_4$ is extracted from the fourth page. In the example in FIG. 6A, all the conditions of $\alpha_3=\alpha_4$, $\beta_3=\beta_4$, $\gamma_3=\gamma_4$, and $\delta_3=\delta_4$ are satisfied. Therefore, it is judged in ST6 that it is possible to combine image areas of the pages from Ps to Pe ('Yes'). In this way, in ST7, a new bitmap image obtained by combining the respective image areas is created. Unlike this example, when it is judged in ST6 that it is impossible to combine image areas of the pages from Ps to Fe ('No'), the main CPU 32 proceeds to ST8 without performing image combination.

Figure 9A:
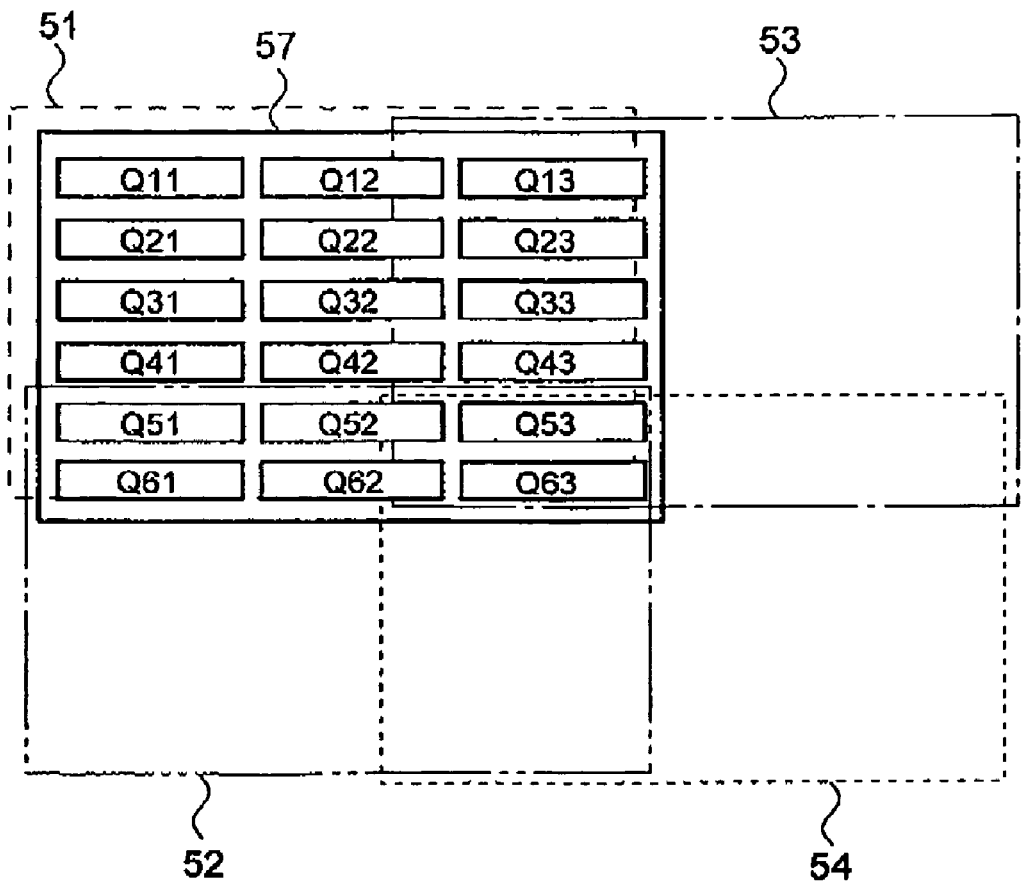
FIG. 9A is a diagram showing a result of combination of the images shown in FIG. 6A.

FIG. 9A is a diagram showing a result obtained by combining the image areas shown in FIG. 6A. As shown in FIG. 6A, there are fixed gaps among the images Qmn of the document. However, when the extracted image areas are combined, gaps are not formed, for example, between the images Q12 and Q13 and between the images Q41 and Q51. Thus, irregularity is caused in a layout of the images. In order to prevent such irregularity in the layout, it is preferable that, in S12, it is possible to set, in the operation unit 12, fixed gaps among image areas to be combined. By setting such gaps, as shown in FIG. 9A, it is possible to obtain a combined image with less irregularity in arrangement of respective images.

The combined image shown in FIG. 9A fits in A4 size, which is the sheet size of the first page, without requiring image reduction. However, when it is impossible to set a combined image in a predetermined sheet size unless a size of the combined image is reduced, as explained earlier, automatic reduction by the main control unit 10 or designation of a reduction ratio in the operation unit 12 by the user is performed.

After the processing in ST7, the main CPU 32 proceeds to ST8. In ST8, the combination start page Ps is set to 5, the combination end page Pe is set to 5, and the sheet size Sz is set to A5 size. Thereafter, the main CPU 32 returns to the judgment in ST2. Since the presently processed page Pn is 5 ('Pn=5'), it is judged in ST2 that the condition 'Pn≧Pm' is not satisfied ('No'). In ST3, the presently processed page Pn is changed to 6 ('Pn=6'). Since a sheet size of the sixth page is A5, it is judged in ST4 that the sheet size designated as Sz and the sheet size of the sixth page are the same ('Yes'). In ST5, the combination end page Pe is changed to 6 ('Pe=6'). The main CPU 32 returns to ST2. Since the presently processed page Pn is 6 ('Pn=6'), it is judged in ST2 that the condition 'Pn≧Pm' is satisfied ('Yes'). The main CPU 32 proceeds to ST9.

Figure 9B:
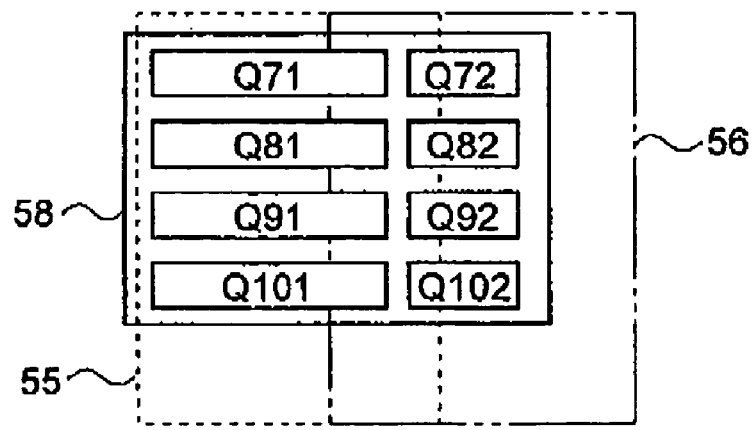
FIG. 9B is a diagram showing a result of combination of the images shown in FIG. 6B.

Since the combination start page Ps is 5 ('Ps=5') and the combination end page Pe is 6 ('Pe=6'), it is judged in ST9 that the condition 'Ps=Pe' is not satisfied ('No') In this way, it is judged in ST10 whether combination of image areas on the fifth page and the sixth page is possible. A method of judgment is the same as the method explained with reference to FIG. 6A. As shown in FIG. 9B, since it is possible to combine the image areas on the fifth page and the sixth page, it is judged in ST10 that combination of image areas on the fifth page and the sixth page is possible ('Yes'). In this way, in ST11, a bitmap image of the combined image shown in FIG. 9B is formed.

Unlike this example, when it is judged in ST9 that the condition 'Ps=Pe' is satisfied ('Yes'), an object of processing is only one sheet. In that case, image combination is not performed and the print job is completed. When it is judged in ST10 that combination of image areas on the fifth page and the sixth page is impossible ('No'), the image combination for the fifth page and the sixth page is not performed and the print job is completed.

Finally, in accordance with the result in S17, printing of the created combined image on a print sheet is performed (S18). In S18, the bitmap images created in ST7 and ST11 are printed on a sheet 57 of A4 size and a sheet 58 of A5 size, respectively. In this way, the print job is completed.

As it is easily understood from the above explanation, when a document consists of four sheets of A4 size and two sheets of A5 size, wherein the first and second pages are A4 size, the third and fourth pages are A5 size, and the fifth and sixth pages are A4 size, possibility of image combination is judged for a pair of the first and the second pages, a pair of the third and the fourth pages, and a pair of the fifth and the sixth pages, respectively. In other words, a result of image combination printing varies depending on an order of sheets of a document.

According to such image combination printing, it is possible to create a document in which images are laid out as desired by a user. Compared with the N-in-1 printing, images on the document are not reduced in size more than necessary and the images are arranged in good appearance. Thus, it is possible to create a distinct document.

It is also possible to perform the image combination printing processing for plural pages explained above at the time of transmission and reception of facsimile data. According to the processing, it is possible to reduce the number of sheets to be transmitted and reduce communication time. In the case of data reception, it is possible to reduce the number of sheets to be printed.

The embodiment of the invention has been explained. However, the invention is not limited to such an embodiment. Various modifications, alterations, and replacements by those skilled in the art are possible within the scope of the invention described in claims. It should be understood that the modifications, the alterations, and the replacements are included in the scope of the invention.

For example, when the image combination printing is performed, a user can set margins on a print sheet in the operation unit 12 and the client PC 30. To arrange a created combined image on the inner side of the margins set, a function of reducing or enlarging the combined image may be given to the main control unit 10.

It is preferable that, in the image forming apparatus 100, when the image combination printing is performed, an arrangement of bitmap images to be subjected to the image combination printing can be freely changed in the operation unit 12 and the client PC 30. For example, a document including a lengthwise sheet 65 of A4 size on which the images Qmn (m=7 to 12, n=1) shown in FIG. 10A are drawn and a lengthwise sheet 66 on which the images Qmn (m=13, n=1) are drawn is considered. It is also preferable that, as shown in FIG. 10B, a lower end of the sheet 65 and an upper end of the sheet 66 are arranged to be opposed to each other and print conditions are set in the operation unit 12 such that combined images Qmn (m=7 to 13, n=1) are printed on done lengthwise sheet 67 of A4 size.

In the explanation, image combination of bitmap images for two pages and bitmap images for four pages is performed. However, the number of pages to be subjected to image combination may be an even number of pages equal to or more than six pages.

What is claimed is:
1. An image forming apparatus comprising:
a receiving unit that receives print data including a first bitmap image including a first image area with a first blank space for a first page and a second bitmap image including a second image area with a second blank space for a second page, both of the first and the second image areas being divided from a single image on a display; and
a control unit that: extracts the first image area without the first blank space from the first bitmap image and the second image area without the second blank space from the second bitmap image; judges if either the widths of the first and the second image areas or the heights of the first and the second image areas are the same; combines the first and the second image areas to be adjacent up and down if the widths are judged to be the same; and combines the first and the second image areas to be adjacent left and right if the heights are judged to be the same, without changing an aspect ratio of the first image area and an aspect ratio of the second image area.

2. An image forming apparatus according to claim 1, wherein the control unit forms a combined image only when a new image having a square or rectangular image area can be formed by combining the first and the second image areas.

3. An image forming apparatus according to claim 2, further comprising
a print processing unit that prints the combined image reduced in size on a sheet when a size of the combined image is larger than a sheet size, the control unit reduces reducing the size of the combined image to a size that fits in the sheet.

4. An image forming apparatus according to claim 3, further comprising an operation unit with which a user sets a reduction ratio of the combined image.

5. An image forming apparatus according to claim 2, further comprising an operation unit with which a user sets margins in a sheet on which the combined image is printed.

6. An image forming apparatus according to claim 2, further comprising an operation unit with which a user sets arrangement of the bitmap images.

7. An image forming apparatus according to claim 2, further comprising an operation unit with which a user sets, to form a combined image in which gaps of a fixed width are provided among the fist and second image areas, the width of the gaps.

8. An image forming apparatus according to claim 2, further comprising a network interface for connecting a client PC, wherein the bitmap images are obtained by subjecting print data transmitted from the client PC via the network interface to bitmap image conversion by the control unit.

9. An image printing method comprising:
receiving print data including a first bitmap image including a first image area with a first blank space for a first page and a second bitmap image including a second image area with a second blank space for a second page, both of the first and the second images being divided from a single image on a display;
extracting the first image area without the first blank space from the first bitmap image and the second image area without the second blank space from the second bitmap image;
judging if either the widths of the first and the second image areas or the heights of the first and the second image areas are the same;
combining the first and the second image areas to be adjacent up and down if the widths are judged to be the same, without changing an aspect ratio of the first image area and an aspect ratio of the second image area; and
combining the first and the second image areas to be adjacent left and right if the heights are judged to be the same, without changing an aspect ratio of the first image area and an aspect ratio of the second image area.

10. An image printing method according to claim 9, wherein a creation of a combined image is performed only when a new image having a square or rectangular image area can be formed by combining the first and the second image areas.

11. An image printing method according to claim 10, further comprising
reducing a size of the combined image to a size that fits in a sheet size, if a size of the combined image is larger than the sheet size; and
printing the combined image reduced in size on a sheet.

12. An image printing method according to claim 9, wherein the bitmap images are obtained by subjecting print data created by a computer to bitmap image conversion.

13. An image forming system comprising:
a receiving unit that receives print data including a first bitmap image including a first image area with a first blank space for a first page and a second bitmap image including a second image area with a second blank space for a second page, both of the first and the second image areas being divided from a single image on a display; and
a control unit that: extracts the first image area without the first blank space from the first bitmap image and the second image area without the second blank space from the second bitmap image; judges if either the widths of the first and the second image areas or the heights of the first and the second image areas are the same; combines the first and the second image areas to be adjacent up and down if the widths are judged to be the same; and combines the first and the second image areas to be adjacent left and right if the heights are judged to be the same without changing an aspect ratio of the first image area and an aspect ratio of the second image area.

14. An image forming system according to claim 13, wherein the control device forms a combined image only when a new image having a square or rectangular image area can be formed by combining the first and the second image areas.

15. An image forming system according to claim 14, further comprising
a print processing unit that prints the combined image reduced in size on a sheet when a size of the combined image is larger than a sheet size, the control unit reducing the size of the combined image to a size that fits in the sheet.

16. An image forming system according to claim 15, further comprising an operation device with which a user sets a reduction ratio of the combined image.

17. An image forming system according to claim 14, further comprising an operation device with which a user sets margins in a sheet on which the combined image is printed.

18. An image forming system according to claim 14, further comprising an operation device with which a user sets arrangement of the bitmap images.

19. An image forming system according to claim 14, further comprising an operation device with which a user sets, to form a combined image in which gaps of a fixed width are provided among the first and the second image areas, the width of the gaps.

20. An image forming system according to claim 14, further comprising:
a network interface for connecting a client PC,
wherein the bitmap images are obtained by subjecting print data transmitted from the client PC via the network interface to bitmap image conversion by the image data processing device.

* * * * *